Oct. 21, 1930.  E. S. MAINE  1,778,862
MOWING MACHINE
Original Filed April 18, 1922   4 Sheets-Sheet 1

Fig. 1

INVENTOR.
ELMER S. MAINE
BY
Victor J. Evans
ATTORNEY.

Patented Oct. 21, 1930

1,778,862

UNITED STATES PATENT OFFICE

ELMER S. MAINE, OF DOVER, NEW JERSEY, ASSIGNOR TO MAINE INDUSTRIES CORPORATION, OF CHICAGO, ILLINOIS, A CORPORATION OF DELAWARE

MOWING MACHINE

Application filed April 18, 1922, Serial No. 554,368. Renewed April 7, 1930.

This invention relates to mowing machines and more particularly to a mowing attachment for tractors.

An object of this invention is to provide a mowing attachment for tractors wherein the reciprocatory cutter bar is driven from the motor of the tractor independently of traction, through the gear transmission of the tractor, thereby permitting multiple speeds of operation of the cutter bar or sickle; to provide a mower which will advantageously mow or cut clover, alfalfa, timothy, or any kind of hay or analogous growth, under conditions such as where the hay is down, tangled or heavy, where mowers of the horse drawn conventional type have a tendency to skid the drive wheels resulting in clogging and stalling of the cutter bar.

A further object of the invention is to provide a power take off structure for attachment to tractors of conventional type, which embodies a detachable gear housing detachably connected to a tractor structure and carrying suitable gears for operative connection with the transmission gearing of the tractor, one of said gears being provided with suitable means to permit detachable connection therewith of a power take off shaft for operating a suitable implement either from the front or rear side of the gear housing.

The provision of a mowing attachment for tractors as above referred to provides a mower which is much lighter in weight and simpler in construction than the conventional type and a further object of the invention is to provide such a mowing attachment which may be easily and quickly attached to or detached from tractors of conventional type, and a tractor operated and propelled structure which can be operated by one man who has full view and control over the tractor and mowing mechanisms.

Another object of this invention is to provide a compound lift mechanism for raising the guard bar and moving it into or out of inoperative position whereby, said operations may be performed by manual operation of a single lever and also to provide means, operated by movement of the guard bar structure into an inoperative position, for automatically cutting off the transmission of power to the reciprocatory cutter bar or sickle and prevent transmission of reciprocating power to the sickle while the guard bar structure and cutter are in an inoperative position.

Another object of the invention is to provide a supporting rod for maintaining the cutter bar of the mower in its transverse cutting position, which rod is yieldably connected to the tractor structure and releasably maintained in supporting position to permit rearward movement upon contact of the cutter bar with an obstruction, and also to mount the guard bar tilting lever upon said supporting rod to permit limited movement of the tilting lever with movement of the rod for preventing the forcing of the guards into the ground.

Other objects of the invention will appear in the following detailed description taken in connection with the accompanying drawings wherein.

Figures 3, 4, 12, 13:
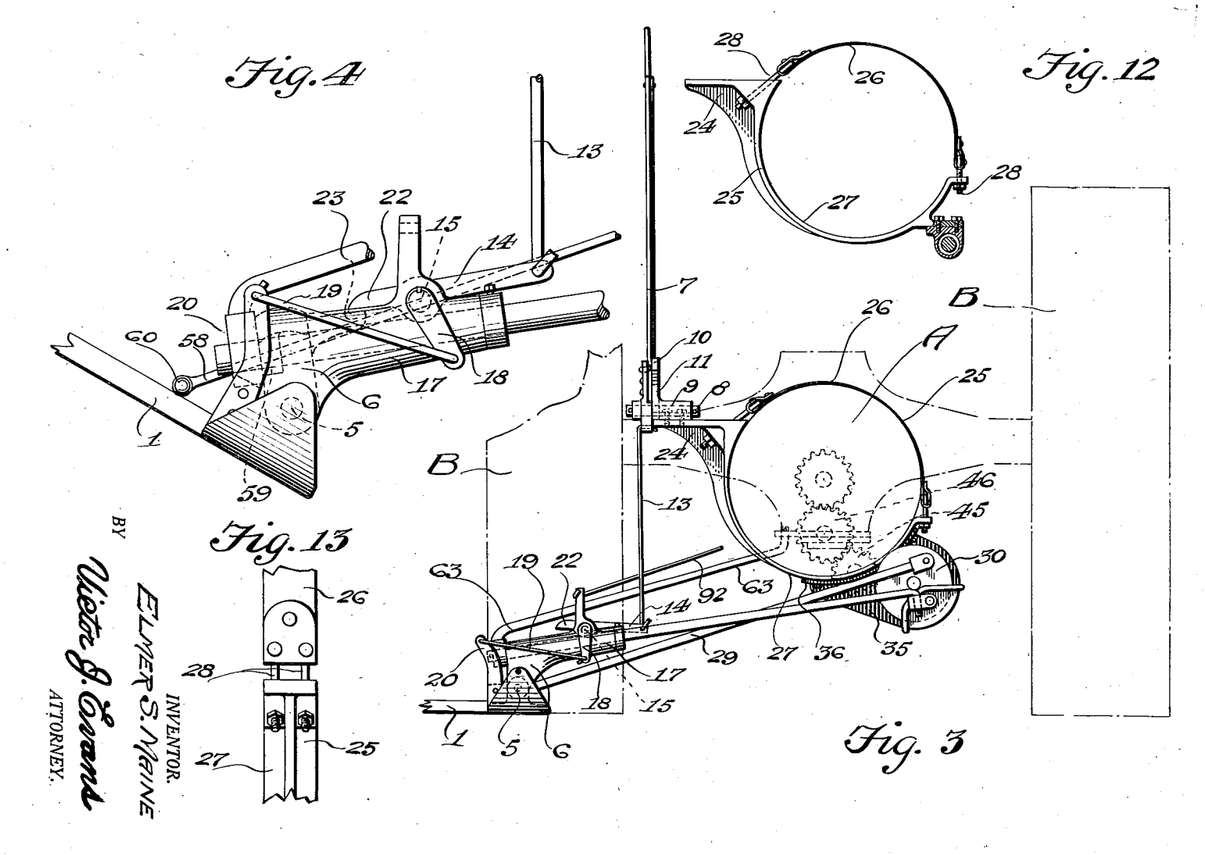
Fig. 3 is a front end elevation of the mower attachment, the means for automatically stopping the mower operating mechanism being omitted.
Fig. 4 is an enlarged detail end elevation illustrating the cutter bar lift mechanism.
Fig. 12 is a detail section illustrating a connecting band utilized for attaching the mowing attachment to a tractor.
Fig. 13 is a detail side elevation of the connecting band used for attaching the mowing attachment to a tractor.
Figures 7, 8, 9, 10, 11:
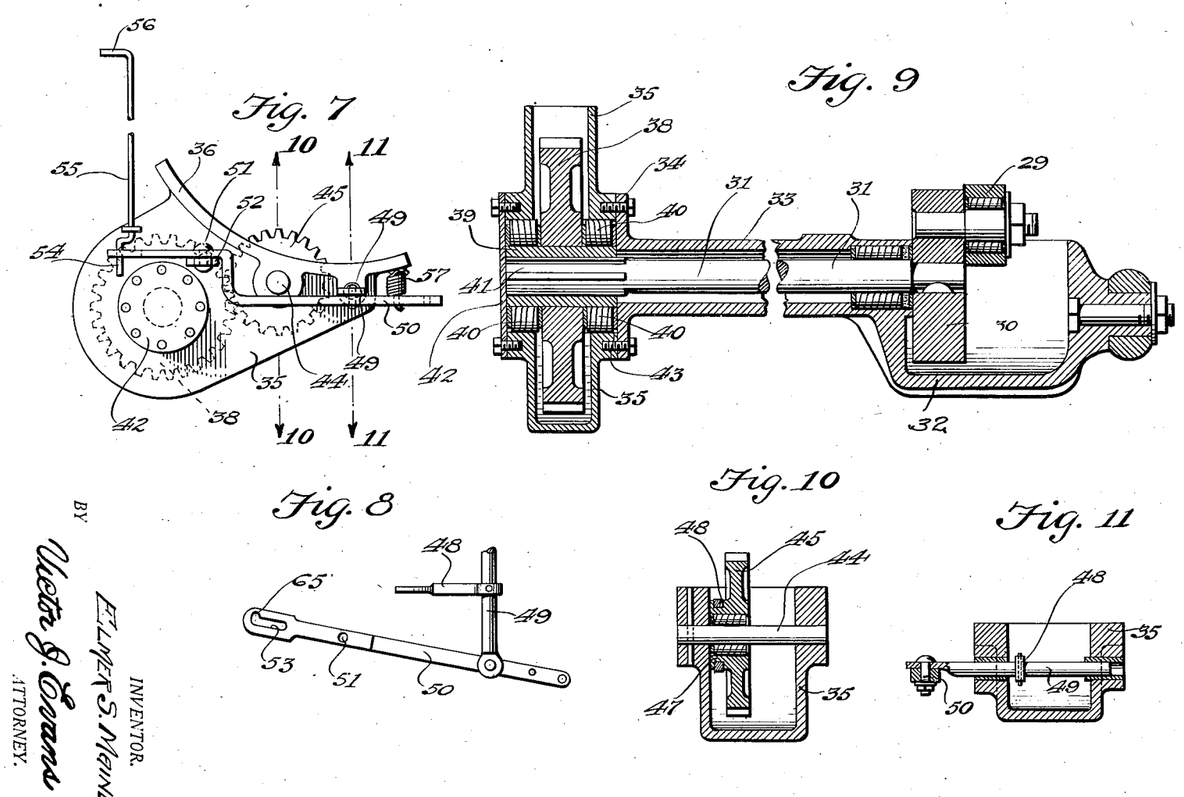
Fig. 7 is an end elevation of the gear housing.
Fig. 8 is a detail view of a lever structure used in connection with the gear mechanism.
Fig. 9 is a detail section on the line 9—9 of Fig. 2.
Fig. 10 is a detail section taken on the line 10—10 of Fig. 7.
Fig. 11 is a fragmentary section taken on the line 11—11 of Fig. 7.

Referring more particularly to the drawing, the improved mowing device is designed for attachment to and operation by a tractor of any conventional form, such a tractor being indicated in dotted lines in certain figures of the drawings. The mowing attachment comprises a guard bar structure 1 having the usual type of reciprocatory sickle 2 and guard 3 associated therewith. The guard bar 1 has the conventional form of shoe 4 at its inner end which is pivotally connected as shown at 5 to the arch bracket 6 to permit pivotal movement of the guard bar structure together with the sickle and guard 3 into a substantially vertical position at which time the mechanism is inoperative for cutting or mowing. The guard bar 1 and the cutting mechanism is moved into an inoperative position by the improved lifting structure which includes a hand lever 7 pivotally mounted upon a suitable stub shaft 8, which stub shaft is in turn supported by a suitable bearing structure 9. The hand lever 7 has an approved type of dog mechanism 10 carried thereby which cooperates with a quadrant 11 for holding the lever in adjusted positions. A substantially T shaped arm 12 is connected to the lever 7, at one end of the arm, and it has a rod 13 connected to its other end. The rod 13 extends downwardly from the T shaped arm 12 and is connected to a lever 14 keyed upon a suitable shaft 15. The stub shaft 15 is in turn rockably carried by the extension 17 of the arch bracket 6. The stub shaft 15 has a bell crank arm 18 formed thereon which is connected by means of a rod 19 to the upstanding arm 20 which is carried by the guard bar 1 so that in the initial movement of the lever 7, the lever 14 will be rocked, bringing its end 22 into engagement with the nib 23 formed on the arch bracket 6 and tilting the cutter bar structure upwardly at an angle as indicated in Fig. 4 of the drawings. Further pivotal movement of the lever 7 will raise the guard bar 1 bodily in a vertical direction, the leverage being exerted through the engagement of the end 22 and nib or extension 23 for moving the guard bar into inoperative position and to permit travel of a tractor and the mowing machine attachment applied thereto without operating the cutting mechanism.

The bearing 9 is supported by a bracket 24 formed upon the clamping band 25, which is mounted about the transmission housing A of the tractor B. The band structure 25 comprises the sections 26 and 27 which are connected as shown at 28, in Figs. 12 and 13 of the drawings to securely clamp the band about the transmission housing A, for connecting the mower structure to the tractor B without requiring the removal of any bolts whatsoever from the transmission housing, the said band tending to increase the strength of the housing rather than weaken it.

Figure 1:
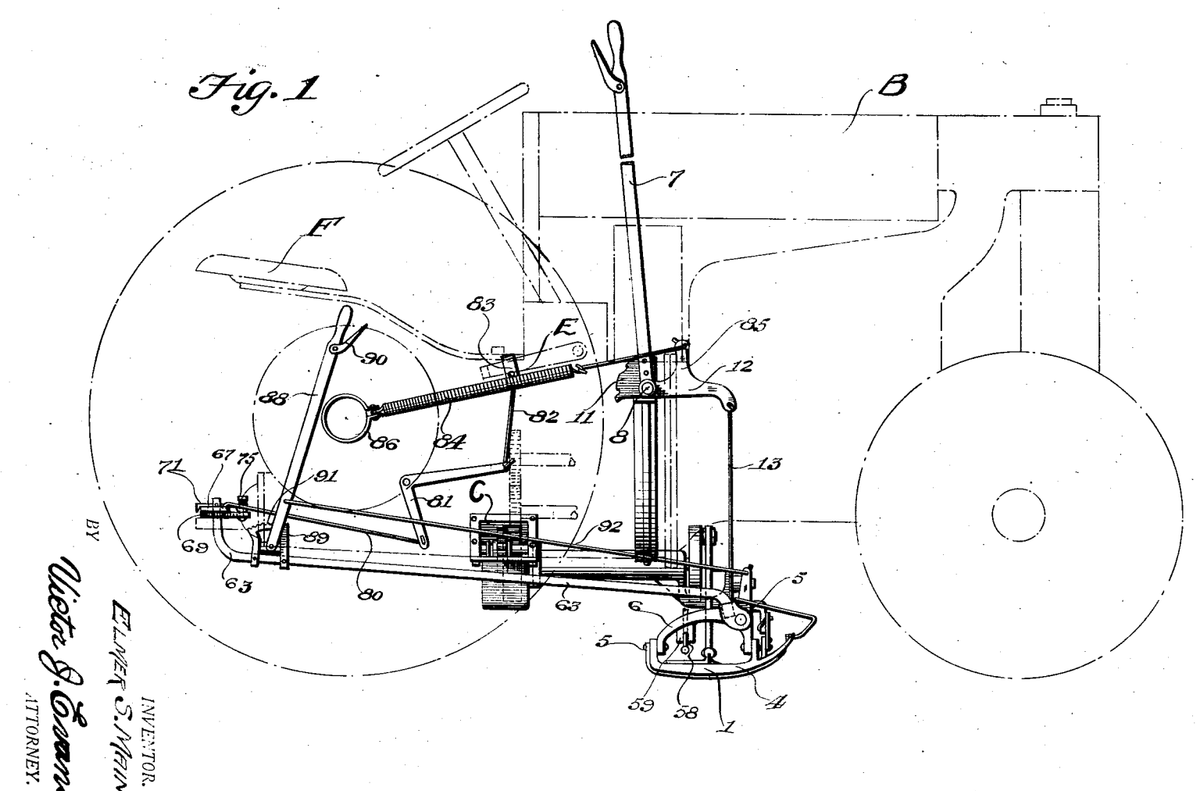
Fig. 1 is a side elevation of the improved mowing attachment and illustrating a part of a tractor in dotted lines.

The pitman 29, which reciprocates the sickle 2 is eccentrically connected, in the usual manner, to the disc 30 and the disc 30 is carried by its operating shaft 31. As is usual in the construction of mowing machines, the disc 30 is enclosed in a suitable housing 32, which housing, however, in the present construction, has a lateral tubular extension 33 formed thereon through which the shaft 31 extends. An annular flange 34 is formed on the end of the extension 33 remote from the housing 32, and it is adapted for detachable connection with a gear box or housing 35. The gear box or housing 35 is provided with a flange 36 about its upper open edge by means of which the housing is attached to the transmission casing of the tractor B, the said casing being provided with an opening as shown at C in Fig. 1 of the drawings having communication with the interior of the housing 35.

The housing 35 may be attached to the tractor casing by bolts or analogous structures and it has a gear 38 rotatably supported therein and mounted upon the bearing sleeve 39 being preferably splined thereto, the sleeve 39 in turn is supported within the housing 35 by roller bearings 40. The sleeve 39 and bearings 40 will maintain the gear 38 in proper position in the housing 35 and the sleeve 39 is grooved to receive the splined end 41 of the shaft 31 for operatively connecting the shaft 31 to the gear 38 to permit the shaft to be rotated by rotation of the gear. When desiring to disconnect the mowing machine construction from the tractor, all that is necessary is to detach the flange 34 and withdraw the shaft 31 longitudinally out of the sleeve 39, and the opening into the housing 35, through which the shaft 31 extends may be closed by a plate similar to the plate 42 which is removably attached to the housing directly opposite the opening 43 through which the shaft 31 extends. By providing the opposite openings, it will be seen, that a shaft similar to the shaft 31 may be connected to the gear 38 to extend either to the front or the rear of the gear casing. When the splined end of the shaft 31 is withdrawn from within the casing 35, the gear 38 will be supported in its proper position by means of the sleeve 39 and the roller bearings 40 so that it will always be in place for operative connection with the shaft 31 or a similar driving shaft.

An auxiliary shaft 44 is carried by the housing 35 and has a gear 45 feathered thereon which gear is adapted for movement into or out of mesh with the gear 46 of the gear transmission of the tractor B at which time the gear 45 will also be in mesh with the gear 38, and thus the sickle 2 will be reciprocated direct from the motor or engine of the tractor B through the gear transmission mechanism of the tractor. The gear 45 has a channeled collar 47 thereon in which a forked arm 48 engages. The arm 48 is carried by a rod 49 which is slidably supported by the housing 35 and has one end pivotally connected to a lever 50. The lever 50 is pivotally mounted intermediate its ends as shown at 51 and upon a suitable boss 52 carried by the housing 35 and it has a slot 53 formed in one end in which the crank end 54 of the operating rod 55 engages. The operating rod 55 projects vertically from the lever 51 and has its upper hand grip 56 positioned to permit convenient operation of the lever 50 from the driver's seat of the tractor, for permitting the shifting of the gear 45 into or out of mesh with the gears 38 and 46. A spring 57 is connected to the lever 50 at the end opposite from the connection between the lever and the operating rod 55 and this spring is also connected to the housing 35 for urging the lever inwardly for moving the gear 45 into mesh.

The gear 46 is the gear in the transmission mechanism of the tractor B which is utilized for transmitting power from the driving to the driven shaft and is operated at all times during operation of the engine or tractor even when the traction gears are shifted into neutral and thus it will be seen that the sickle 2 may be reciprocated independently of the traction of the tractor and at various speeds, depending upon the work to be performed, and further it is obvious that with such a construction the cutter bar may be reciprocated at the highest speed for evenly and cleanly cutting tangled or heavy hay without increasing the traction speed of the tractor thereby permitting clean and efficient mowing or cutting of hay or analogous material irrespective of the quality or quantity per acre of the crop.

Owing to the connection between the sickle 2 and its driving mechanism it is desirable and in fact necessary to arrest or stop reciprocation of the sickle when the cutter bar is moved into an inoperative position, and a mechanism is provided in the present invention to automatically cut off driving connection between the sickle and transmission gear 46 when the cutter bar 1 is moved into inoperative position.

The mechanism just referred to comprises a rod 58 slidably supported by a suitable extension 59 on the bracket 6. A knob or ball 60 is mounted or formed upon the free end of the rod 58 and is positioned to be engaged by the guard bar during its upward movement, after the guard bar reaches a pre-determined height and upon continued movement of the guard bar, into inoperative position, such movement will move the rod 58 longitudinally and rock the bell crank 61. The bell crank 61 is pivotally supported on a suitable bracket 62 carried by the bracing rod 63. The rocking of the bell crank 61 will move the rod 64 longitudinally, which movement in turn will operate or rock the lever 50 for urging the rod 49 outwardly and moving the gear 45 out of mesh with the gears 46 and 38, and the transmission power to the sickle 2 will be arrested or cut off. When the cutter bar structure 1 is again lowered into an operative position, the lever 50 is urged or moved inwardly into its normal position for shifting the gear 45 into mesh with the gear 46, under contracting action of the spring 57. The action of the spring 57 also returns the rod 64, bell crank 61 and rod 58 to their normal positions. However, at times, it is desired to lock the shifting lever 50 in shifted position to prevent accidental movement of the gear 45 and to permit such locking action, the rod 55 and its crank portion 54 are utilized, the slot 53 being provided with a lateral extension 65 and when the rod 55 is turned to engage in the lateral extension 65, it will lock the lever 50 against pivotal movement.

The natural instinct of a horse causes it to stop when the cutter bar structure of a mowing machine, strikes an obstruction and thus breaking of the cutter bar is prevented, however, with a tractor operated mowing machine, it is desirable to provide a mechanism which will automatically stop or arrest tractive movement of the tractor when an obstruction is engaged by the cutter bar, to prevent breaking of a part of the mowing machine.

Figures 2, 5, 6:
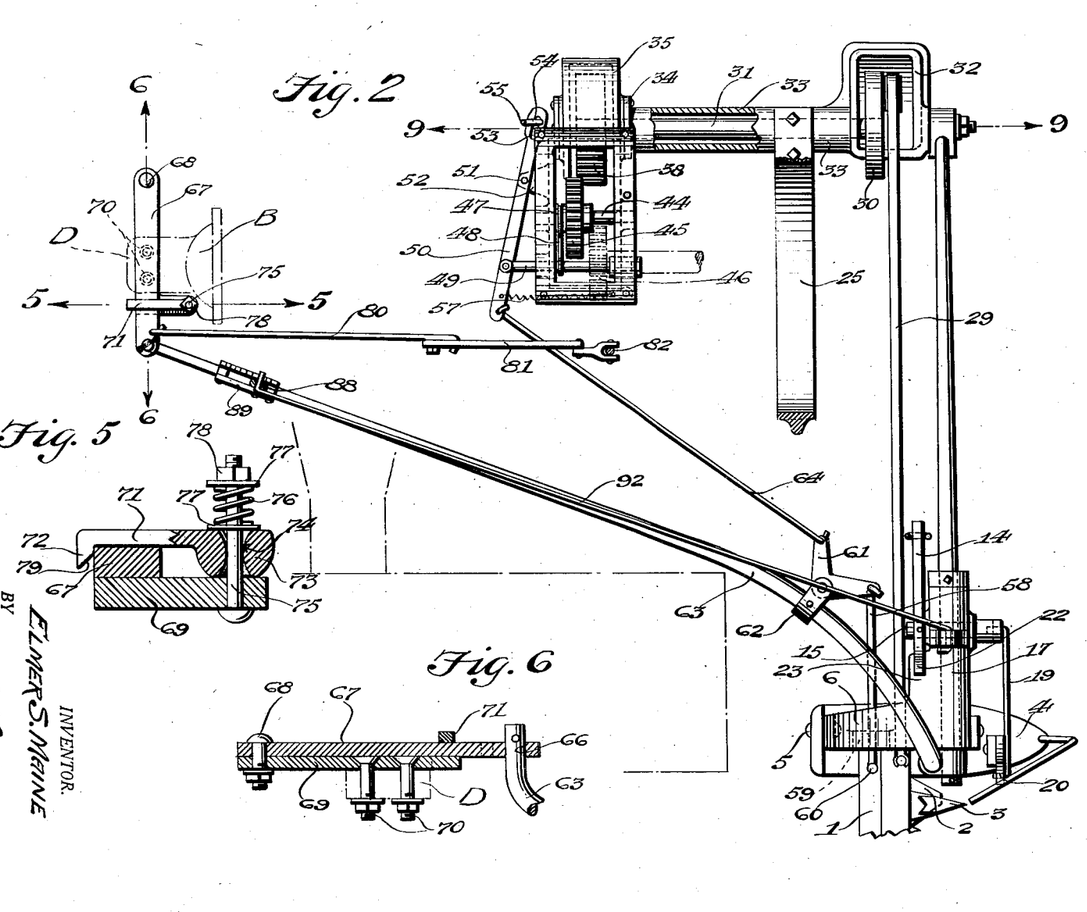
Fig. 2 is a top plan of the mower attachment.
Fig. 5 is a detail section on the line 5—5 of Fig. 2.
Fig. 6 is a cross section on the line 6—6 of Fig. 2.

The present invention embodies the rod 63 which is connected to the cutter bar structure, and serves as a brace rod for supporting the cutter bar structure in its proper cutting position. The rod 63 extends rearwardly, and has its rear end upturned and projecting through an opening 66 formed in the free end of the release bar 67. The release bar 67 is pivotally connected, by a bolt 68 to its attaching bar 69. The attaching bar 69 is in turn connected to the draw bar connection D of the tractor B by suitable bolts 70. The release bar 67 is held in proper position or in alignment with the attaching bar 69 by a releasable catch 71 having a bill 72 on one end which engages over the release bar 67. The releasable catch 71 has an enlarged head 73 formed upon its forward end which is provided with a transverse opening 74, the walls of which are convexly curved longitudinally of the opening, as clearly shown in Fig. 5 of the drawings to permit rocking of the catch 71 upon the bolt 75 by means of which the catch is attached to the attaching bar 69. A spring 76 is coiled about the bolt 75 and engages against spaced washers 77, on the bolt for urging the head 73 in engagement with the attaching bar 69 and consequently urging the releasable catch 71 in locking position relative to the release bar 67. The tension of the spring 76 is regulated by a nut 78. In case the cutter bar strikes an obstruction, the force of contact of the cutter bar and the obstruction will be administered to the rod 63 and owing to the angled edge 79 of the bill 72, such force will force the catch 71 into released position, against the tension of the spring 76 and permit the bar 67 to swing rearwardly upon its pivot 68 for preventing breaking of any of the parts of the cutter bar structure. The releasing bar 67 has a rod 80 connected thereto which is in turn connected to one end of the bell crank 81, and the bell crank 81 is connected by means of a rod 82 and clip 83 to the clutch pedal E of the tractor B so that when the releasing bar 67 is forced rearwardly, the clutch pedal E will be operated for automatically arresting forward or tractive movement of the tractor. The operator can then back the tractor and mowing attachment and raise the cutter bar structure, by means of the lever 7, to clear the obstruction, then move the tractor forward past the obstruction and lower the guard bar into operative position at which time connection between the sickle 2 and the gear 46 will be automatically re-established. A spring 84 is connected to the upstanding arm 85 on the substantially T shaped rocker arm 12 and to the tractor structure B by a suitable clamping band 86. The spring 84 is tensioned to assist in the manual raising of the cutting mechanism.

In the present improved mowing machine attachment, the tilting lever 88, by means of which the transverse angle of inclination of the sickle 2 is regulated, is pivotally supported by a quadrant structure 89 which is mounted upon the rod 63. The lever 88, which carries a suitable dog mechanism 90 for cooperation with the quadrant teeth 91 is connected to the cutter bar structure 1 by a rod 92, so that as the lever 88 is operated the guard bar may be tilted. By mounting the improved tilting lever 88 upon the bracing rod 63 synchronous movement of the tilting lever and guard bar is permitted when the cutting mechanism is forced rearwardly by striking an obstruction, it will be apparent that the lever will be carried rearwardly with the movement of the guard bar and thus the tilting of the guard bar structure which will cause the guards to gouge into the ground, will be prevented. As clearly shown in Fig. 1 of the drawings, the attachment of the lever 88 to the rod 63 also permits the positioning of the lever so that it can be conveniently reached from the seat F of the tractor B.

It is, of course, to be understood that the invention may be constructed in other manners and the parts associated in different relations and, therefore, I do not desire to be limited in any manner except as set forth in the claims hereunto appended.

Having thus described my invention what I claim is:

1. In combination, a tractor including a gear transmission, a support carried by said tractor and mounted for movement into and out of operative position, means for varying the transverse angle of inclination of said support, a reciprocatory sickle on said support, means for reciprocating said sickle, said last named means operated from said gear transmission for reciprocating the sickle independent of traction of the tractor, means for automatically cutting off operative connection of said sickle and gear transmission upon movement of the support and sickle in inoperative position, and means for automatically arresting travel of the tractor upon engagement of said support with an obstruction.

2. In a mowing machine, the combination with a reciprocatory sickle, adapted to be raised to inoperative position, of means for reciprocating the sickle, comprising a driving gear, a shiftable idler gear for rotating said driving gear, said shiftable driving gear adapted to mesh with a gear of a tractor transmission, and means engaged by said sickle when moved to inoperative position for automatically shifting said idler gear into idle inoperative position.

3. In a mowing machine, the combination with a reciprocatory sickle, of means for reciprocating the sickle comprising a driving gear, a shiftable idler gear for rotating said driving gear, said shiftable driving gear adapted to mesh with a gear of a tractor transmission, and means for automatically shifting said idler gear into idle inoperative position at pre-determined times, and means for automatically returning said idler to an operative position.

4. In a mowing machine, the combination with a reciprocatory sickle, of means for reciprocating the sickle comprising a driving gear, a shiftable idler gear for rotating said driving gear, said shiftable driving gear adapted to mesh with a gear of a tractor transmission, means for automatically shifting said idler gear into idle inoperative position at pre-determined times, means for automatically returning said idler to an operative position, and locking means to prevent return movement of said idler gear to an operative position.

5. In a mowing machine, a sickle adapted to be raised to inoperative position, a driving gear for said sickle, an idler gear adapted for meshing with a driving gear, a shifting lever, means connecting said shifting lever and said idler gear for moving the idler gear out of mesh with its driving gear, a spring for returning said idler gear to operative position, means for operating said lever, locking means on said lever coacting with said operating means for preventing the return movement of said idler gear by said spring, and means adapted to be engaged by said sickle when moved to inoperative position for operating said lever.

6. In a mowing machine, the combination with a support carrying a sickle adapted for movement into and out of operative position, of a driving gear for said sickle, an idler gear for rotating said driving gear, said idler gear supported for shifting movement into or out of mesh with the driving gear, a shifting lever for shifting said gear, and means operated upon movement of said support and sickle in inoperative position for shifting said lever to move said idler gear out of an operative position.

7. In a mowing machine, the combination with supporting means for a cutting mechanism, of a bracing rod for said means, releasable means normally maintaining said rod in bracing position, a tilting lever for varying the transverse angle of said first named means carried by said bracing rod and movable therewith.

8. In a mowing machine, the combination with a cutter supporting bar, of a bracing rod connected thereto, a releasing lever, means connecting said rod to said releasing lever, and a yieldably mounted catch normally holding said releasing lever against releasing movement.

9. In combination, a tractor including a gear transmission, a supporting structure carried by said tractor, a reciprocatory sickle on said supporting structure, means operatively connecting said sickle and gear transmission for operating the sickle by operation of the gear transmission independently of traction of the tractor, a bracing rod connected to said supporting structure, and releasable means connecting said bracing rod and supporting structure and normally maintaining the bar in bracing position.

10. In combination, a tractor including a gear transmission, a support carried by said tractor, a reciprocatory sickle on said support, means operatively connecting said sickle and gear transmission for operating the sickle by operation of the gear transmission independently of traction of the tractor, a bracing rod connected to said support, and releasable means connecting said bracing rod and support and normally maintaining the support in bracing position, said releasable means being adapted to be released upon engagement of said support with an obstruction to permit rearward yielding movement of the support and sickle carried thereby.

11. In combination, a tractor, including a gear transmission, a sickle supporting bar carried by said tractor, a reciprocatory sickle on said bar, means operatively connecting said sickle and gear transmission for operating the sickle by operation of the gear transmission independently of traction of the tractor, a bracing rod connected to said bar, and releasable means connecting said bracing rod and bar and normally maintaining the bar in bracing position, said releasable means being adapted to be released upon engagement of said bar with an obstruction to permit rearward yielding movement of the bar, and means operated by releasing movement of said releasable means for automatically arresting operation of the tractor.

12. In combination, a tractor including a gear transmission, a supporting structure carried by said tractor, a reciprocatory sickle on said supporting structure, means operatively connecting said sickle and gear transmission for operating the sickle by operation of the gear transmission independently of traction of the tractor, a bracing rod connected to said supporting structure, and releasable means connecting said bracing rod and supporting structure and normally maintaining the same in bracing position, said releasable means being adapted to be released upon engagement of said supporting structure with an obstruction to permit rearward yielding movement of the supporting structure, and a tilting lever for varying the transverse angle of said supporting structure carried by said bracing rod and movable therewith.

13. In combination, a tractor including a prime mover, a reciprocatory sickle carried by said tractor, means for connecting said sickle and prime mover for operating said sickle from the prime mover independently of traction of the tractor, a bracing rod for bracing said sickle, releasable means connecting said bracing rod and tractor and adapted to be released upon engagement of the sickle with an obstruction to permit rearward yielding movement of the sickle.

14. In combination, a tractor including a prime mover, a reciprocatory sickle carried by said tractor, means for connecting said sickle and prime mover for operating said sickle from the prime mover independently of traction of the tractor, a bracing rod for bracing said sickle, releasable means connecting said bracing rod and tractor and adapted to be released upon engagement of the sickle with an obstruction to permit rearward yielding movement of the sickle, and means operable upon operation of said releasable means for automatically arresting travel of the tractor.

15. In an attachment for a tractor having driving members, a prime mover and power transmission gearing for transmitting the power to said driving members, including elements driven directly by said prime mover, said power transmission gearing being disposed between said prime mover and driving members, the combination with an implement detachably supported from said tractor; of rotary driving means for said implement; and a detachable driving connection for said rotary driving means including a member having sliding connection with said directly driven elements of the power transmission gearing of said tractor.

16. In an attachment for a tractor having drive members, a motor and power transmission gearing interposed between the motor and drive members and enclosed within a gear casing, the combination with a support fixed directly to the gear casing; and a gear rotatably journaled on said support, said gear being provided with holding means for axially and detachably receiving for direct connection thereto, and in driving relation, the driving element of an implement adapted to be propelled with said tractor.

17. In a mechanism of the character indicated, adapted for attachment to a tractor provided with propelling members, a motor and power transmission gearing interposed between the motor and the propelling members, the combination with a driving member; of a bearing for said driving member attached to the tractor in a position to dispose said driving member in cooperative relation with the transmission gearing, said driving member having coupling means operatively associated therewith for detachably receiving a cooperating coupler element of the driving connection of an implement adapted to be carried along by said tractor at either side of said tractor.

18. In an attachment for a tractor having driving means, a prime mover, and power transmitting gearing disposed intermediate said prime mover and driving means, said gearing being enclosed within a gear casing, the combination with a supporting member having means associated therewith for clamping the same to the gear casing, said means embracing said gear casing; of power transmission means carried by said supporting member adapted to be driven by the power transmission gearing; an operating implement carried by said tractor, said implement being adapted to be driven by said power-transmission means.

19. In combination, a tractor including a motor, propelling means for said motor, driving connections between the motor and propelling means, a gear transmission cooperating with the motor, a supporting structure, a reciprocatory sickle on said structure, means for operating said sickle from the gear transmission independently of the traction of the motor, and means for automatically disengaging said driving connection to arrest travel of the tractor upon engagement of said supporting structure with an obstruction.

20. In combination, a tractor, including a power plant, propelling means for the tractor, a gear transmission operatively coupled to the power plant, a supporting structure carried by the tractor and mounted for movement into and out of operative position, means for varying the transverse angle of inclination of said supporting structure, a reciprocatory sickle on said supporting structure, means for reciprocating said sickle, said last named means operative from said gear transmission for reciprocating the sickle independent of traction of the tractor, and means for automatically disconnecting said propelling means from the power plant to arrest travel of the tractor upon engagement of said supporting structure with an obstruction.

21. In a mowing machine, the combination with a bar and a cutting mechanism supported thereby; of a bracing rod for said bar; and automatically releasable locking means including inter-engaging latch elements yieldably held engageable for normally maintaining said bar in bracing position.

22. In a mowing machine, the combination with means for supporting a cutting mechanism; of a bracing rod therefor; releasable means including yieldably held interlocking latch elements for normally maintaining said bar in bracing position; and means for effecting release of said releasable means upon engagement of the first named means with an obstruction to permit rearward yielding movement of the cutter bar.

23. In an attachment for a tractor having propelling means, a motor and transmission gearing interposed between the motor and propelling means, the combination with a rotatable driving member; of movable driving means for an implement operated by the motor of said tractor, said driving means and driving member having co-acting axially extending interengaging elements thereon for non-rotatably and detachably connecting said driving means to said driving member.

24. In an attachment for a tractor having driving means, a prime mover and power transmission gearing disposed intermediate said prime mover and driving means and enclosed within a gear case, the combination with a supporting member adapted to be permanently attached directly to said gear case; of power transmission means carried by said supporting member and adapted to be driven directly by said power-transmitting gearing, said transmitting means including a rotatable member; an operating implement carried by said tractor; a rotary shaft for driving said implement, said shaft being bodily rotatable with said last named member; and inter-engaging elements on said shaft and rotatable member for removably connecting said shaft to said last named member, said inter-engaging elements being constructed to prevent relative rotation between said shaft and rotatable member but permitting axial detachment of said shaft with reference to said rotatable member, whereby said shaft is connected to said power transmission means for ready detachment.

25. In a mechanism of the character described adapted for attachment to a tractor provided with drive members, a motor and power transmission gearing interposed between the motor and the drive members, the combination with an implement detachably supported from said tractor; of means for operatively connecting said implement to said transmission gearing, said means including a movable element journaled in a bearing, detachably mounted on said tractor, said element and transmission gearing having interfitting holding members thereon forming a slidable detchable connection between said element and gearing while preventing relative rotation between said element and gearing.

26. In a mechanism of the character described, adapted for attachment to a tractor, provided with drive members, a motor and power transmission gearing interposed between the motor and drive members, said transmission gearing including a driving pinion, the combination with an implement detachably supported on said tractor and having a driving gear for driving said implement; of means for operatively connecting said driving gear to said driving pinion, said means including a shiftable gear element journaled in a bearing detachably mounted on said tractor, said gear element being shiftable to establish driving relation between said driving pinion and said driving gear, or to interrupt said driving relation.

In testimony whereof I affix my signature.

ELMER S. MAINE.